United States Patent
Gogolev et al.

(10) Patent No.: US 11,870,676 B2
(45) Date of Patent: Jan. 9, 2024

(54) METHOD FOR TESTING NETWORKS USING TEST DATA FLOWS

(71) Applicant: ABB Schweiz AG, Baden (CH)

(72) Inventors: Alexander Gogolev, Dachau (DE); Abdulkadir Karaagac, Ladenburg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/961,759

(22) Filed: Oct. 7, 2022

(65) Prior Publication Data

US 2023/0111201 A1 Apr. 13, 2023

(30) Foreign Application Priority Data

Oct. 8, 2021 (EP) .................................... 21201586

(51) Int. Cl.
*G06F 15/173* (2006.01)
*H04L 43/55* (2022.01)
*H04L 43/50* (2022.01)
*H04L 43/10* (2022.01)

(52) U.S. Cl.
CPC .............. *H04L 43/55* (2022.05); *H04L 43/10* (2013.01); *H04L 43/50* (2013.01)

(58) Field of Classification Search
CPC ...................................................... H04L 43/55
See application file for complete search history.

(56) References Cited

U.S. PATENT DOCUMENTS

| | | | |
|---|---|---|---|
| 2015/0365312 A1* | 12/2015 | Pasuparthy | H04L 43/10 709/224 |
| 2016/0285729 A1* | 9/2016 | Chinthalapati | H04L 43/0894 |
| 2020/0162589 A1* | 5/2020 | Vijayadharan | H04L 41/22 |

FOREIGN PATENT DOCUMENTS

| | | | | |
|---|---|---|---|---|
| CN | 107453884 A | * | 12/2017 | ......... H04L 41/0843 |
| WO | WO 2020/143900 A1 | | 7/2020 | |
| WO | WO-2020143900 A1 | * | 7/2020 | ............... H04L 1/08 |

OTHER PUBLICATIONS

Gogolev et al., "A simpler TSN? Traffic Scheduling vs. Preemption," *2020 25th IEEE International Conference on Emerging Technologies and Factory Automation (ETFA)*, IEEE, 1: 183-189 (Sep. 8-11, 2020).

Gogolev et al., "TSN-Enabled OPC UA in Field Devices," *2018 IEEE 23rd International Conference on Emerging Technologies and Factory Automation (ETFA)*, IEEE, 1: 297-303 (Sep. 4-7, 2018).

(Continued)

*Primary Examiner* — Richard G Keehn
(74) *Attorney, Agent, or Firm* — Leydig, Voit & Mayer, Ltd.

(57) ABSTRACT

A method for testing a network that comprises multiple devices includes sending, by a first device that is a regular participant of the network, on a path through the network, a test data flow to a second device that is another regular participant of the network; sending, by the second device, the received test data flow, and/or at least one diagnostic metric derived from this received test data flow, to a diagnostic entity; and determining, by the diagnostic entity, based at least in part on the test data flow, and/or on the diagnostic metric, received from the second device, whether the path through the network is performing according to at least one predetermined criterion.

15 Claims, 2 Drawing Sheets

(56) References Cited

OTHER PUBLICATIONS

Gogolev et al., "TSN Traffic Shaping for OPC UA Field Devices," *2019 IEEE 17th International Conference on Industrial Informatics (INDIN)*, IEEE, 1: 951-956 (Jul. 22-25, 2019).
European Patent Office, Extended European Search Report in European Patent Application No. 21201586.1, 8 pp. (dated Mar. 18, 2022).

\* cited by examiner

METHOD FOR TESTING NETWORKS USING TEST DATA FLOWS

CROSS-REFERENCE TO RELATED APPLICATIONS

This patent application claims priority to European Patent Application No. 21201586.1, filed on Oct. 8, 2021, which is incorporated herein in its entirety by reference.

FIELD OF THE DISCLOSURE

The present disclosure relates to the testing of communication networks, such as time-sensitive networks (TSN) for use by distributed control systems (DCS).

BACKGROUND OF THE INVENTION

The monitoring and active controlling of an industrial plant is based on various information gathered within the plant. For example, sensor devices output measurement values, and actuator devices report their operational status. The information may be used by a distributed control system, DCS. For example, sensor data may be used as feedback in control loops that control the plant such that certain state variables, such as a temperature or a pressure, are kept at desired set-point values.

Such communication is time-critical. It needs to be guaranteed that any change in measurement values is communicated in a timely manner, such that the DCS can react to the change. Also, any actions taken by the DCS need to be communicated to actuators in the plant in a timely manner. Time-sensitive networks, TSN, nominally guarantee end-to-end-determinism in the communication. However, the network may deviate from this nominal state for a variety of reasons, including configuration errors, hardware or cabling faults, or hardware and/or software components that promise a certain performance but just fail to deliver on this promise.

WO 2020/143 900 A1 discloses a method for handling failure of a TSN communication link in a TSN network.

BRIEF SUMMARY OF THE INVENTION

The present disclosure describes a method for facilitating testing of a communication network, so as to verify that is in a proper working state and can be relied upon for time-critical communications.

More specifically, the disclosure describes a method for testing a network that comprises multiple devices. The network may, for example, be chosen to be a network that is configured to carry network traffic of a distributed control system, DCS, in an industrial plant. In particular, such a network may be chosen to be deterministic with respect to resource allocation and/or traffic scheduling. A time-sensitive network, TSN, is a prime example of such a deterministic network.

In the course of the method, a first device that is a regular participant of the network sends a test data flow to a second device that is another regular participant of the network. The second device sends the received test data flow, and/or at least one diagnostic metric derived from this received test data flow, to a diagnostic entity. The at least one diagnostic metric may, for example, relate to throughput, latency, reliability and/or jitter.

The diagnostic entity then determines, based at least in part on the test data flow, and/or on the diagnostic metric, that it has received from the second device, whether the path through the network is performing according to at least one predetermined criterion.

In this manner, the complete network infrastructure along the path between the first device and the second device may be tested in one go. In particular, the path from the first device to the second device is not required to be the shortest one that is available in the network. Rather, by choosing a longer path through the network, a larger part of the network may be tested. In particular, the path through the network from the first device to the second device may be chosen to comprise all network infrastructure devices of the network. This may not allow for a direct pinpointing of the root cause of a problem in the network. But for many applications, it is much more important to test whether the network as a whole is functional. If any problem is detected in a network that is used for conveying control traffic in an industrial plant, no matter what the exact root cause is, it may be advantageous to act upon the industrial plant immediately to move it to a safe state in which a delay or even failure of delivery of messages will no longer cause plant shutdown or even plant damage. For example, an orderly shutdown of the process executed on the plant may be initiated. As a less drastic measure, the production rate of the process may be slowed down to a point where other safety systems or even manual intervention can react fast enough to prevent damage in case the performance of the network degrades further.

BRIEF DESCRIPTION OF THE SEVERAL VIEWS OF THE DRAWING(S)

DETAILED DESCRIPTION OF THE INVENTION

Figure 1:
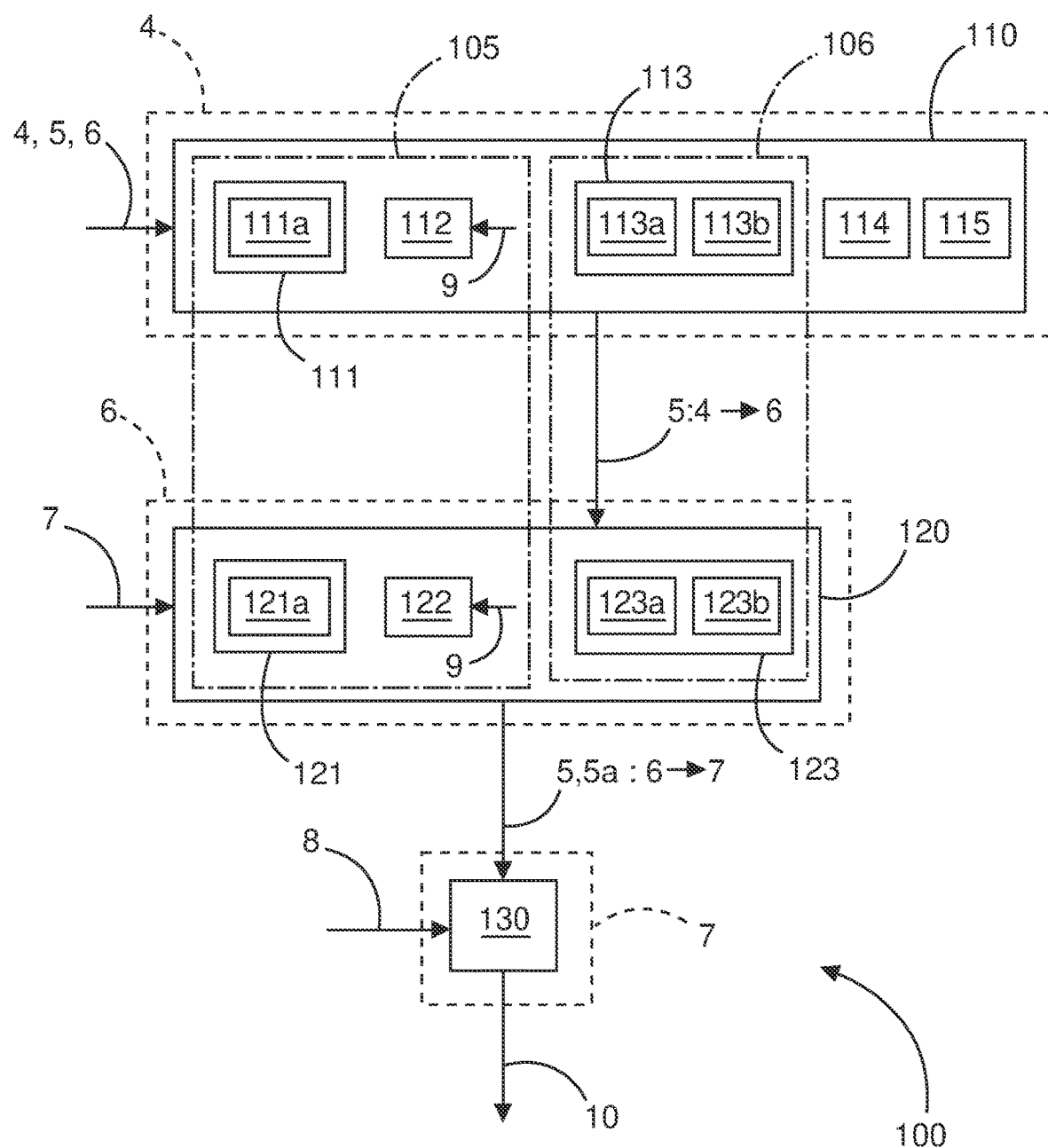
FIG. 1 is a block diagram of a network that comprises multiple devices and that utilizes a method in accordance with the disclosure.
Figure 2:
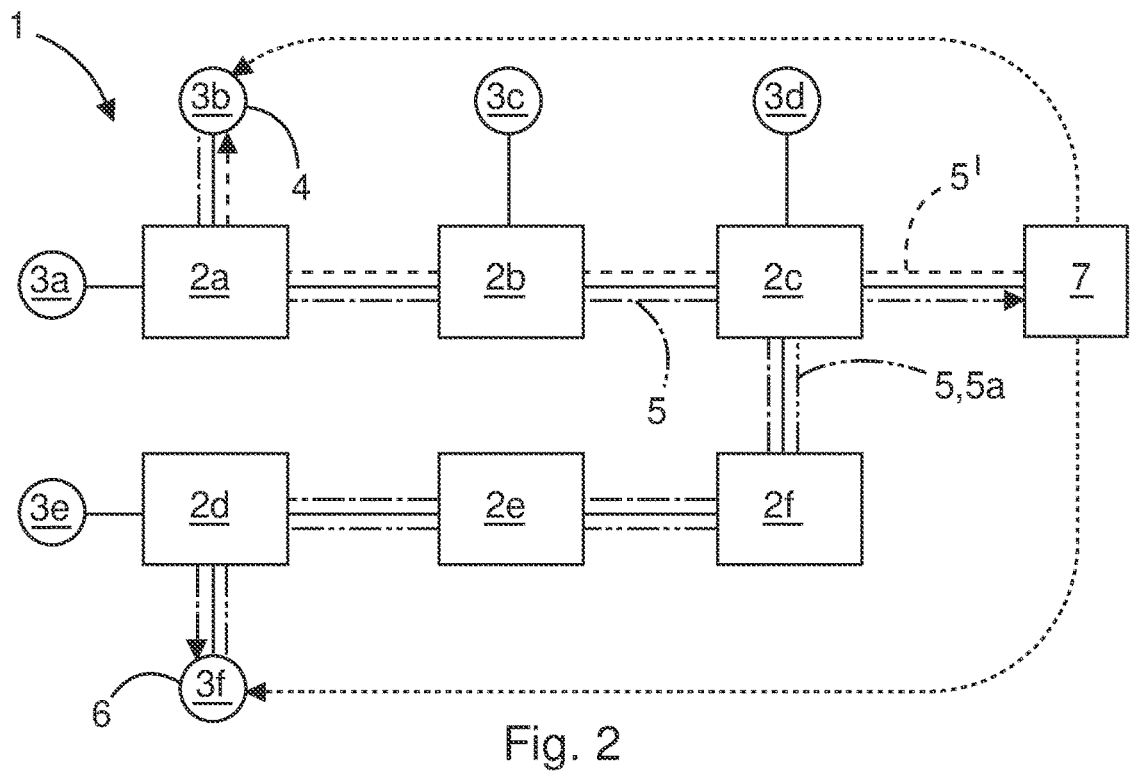
FIG. 2 is a flowchart for a method applied to a network with an end device as its first device and an end device as its second device, in accordance with the disclosure.
Figure 3:
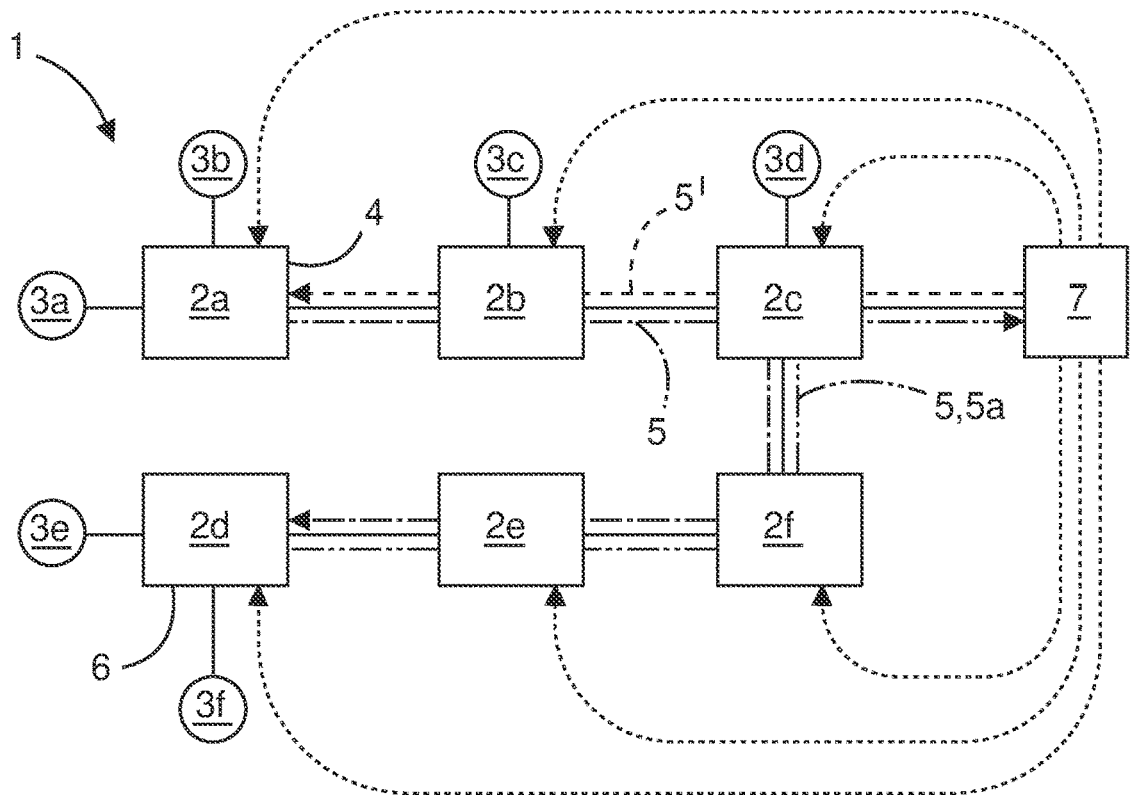
FIG. 3 is a flowchart for a the method applied to a network having a TSN bridge as its first device and another TSN bridge as its second device.

In the present disclosure FIG. 1 illustrates an exemplary embodiment of a method 100 for testing a network 1 that comprises multiple devices 2a-2f, 3a-3f. FIG. 2 illustrates an exemplary application of the method 100 to the network 1 with end device 3b as first device 4 and end device 3f as second device 6. FIG. 3 illustrates another exemplary application of the method 100 to a network 1 with TSN bridge 2a as first device 4 and TSN bridge 2d as second device 6.

More specifically, FIG. 1 is a schematic flow chart of an embodiment of a method 100 for testing a network 1. The network 1 comprises multiple network infrastructure devices 2a-2f and multiple end devices 3a-3f.

In step 110, a first device 4 that is a regular participant of the network 1 sends a test data flow 5 to a second device 6 that is another regular participant of the network 1.

In step 120, the second device 6 sends the received test data flow 5, and/or at least one diagnostic metric 5a derived from this received test data flow 5, to a diagnostic entity 7.

In step 130, the diagnostic entity 7 determines whether the path through the network 1 is performing according to at least one predetermined criterion 8. This determination 10 is based at least in part on the test data flow 5, and/or on the diagnostic metric 5a, that the diagnostic entity 7 has received from the second device 6.

According to block 105, the first device 4 and the second device 6 may be chosen to be end devices 3a-3f that are sources and/or sinks for traffic in the network 1 during its intended regular operation. According to block 111, the diagnostic entity 7 may then publish an instruction to send the test data flow 5 to the second device 6. This publication may be made to a topic and/or channel to which the first device 4 is subscribed, so that the first device 4 gets it. In particular, according to block 111a, the instruction to send the test data flow 5 to the second device 6 may comprise an instruction to convert a data flow 5' received from the diagnostic entity 7 into the test data flow 5 by changing metadata of this data flow 5'.

Likewise, according to block 121, the diagnostic entity 7 may publish an instruction to send the data flow 5 received at the second device 6, and/or the diagnostic metric 5a derived from this test data flow 5, to the diagnostic entity 7. This publication may be made to a topic and/or channel to which the second device 6 is subscribed, so that the second device 6 gets it. In particular, according to block 121a, the instruction to send the received test data flow 5 to the diagnostic entity 7 may comprise an instruction to change metadata of this received test data flow 5.

According to block 112, the first device 4 may request, from a network management entity 9, configuration of network infrastructure devices 2a-2f so as to provide a path from the first device to the second device 6 through the network 1.

Likewise, according to block 122, the second device 6 may request, from a network management entity 9, configuration of network infrastructure devices 2a-2f so as to provide a path from the second device 6 to the diagnostic entity 7.

According to block 106, the first device 4 and the second device 6 may be chosen to be network infrastructure devices 2a-2f that forward data flows between end devices 3a-3f as sources and sinks. According to block 113, the diagnostic entity 7 may then change a forwarding configuration of the first device 4 to forward a data flow 5' received from the diagnostic entity 7 to the second device 6 as the test data flow 5. In particular, the forwarding of the test data flow 5 may comprise:
- changing, by the first device 4, metadata of individual packets of the incoming test data flow 5', according to block 113a; or
- creating a new data flow with the payload of the incoming test data flow 5', according to block 113b.

Likewise, according to block 123, the diagnostic entity 7 may change a forwarding configuration of the second device 6 to forward a test data flow 5 received from the first device 4 to the diagnostic entity 7. In particular, this forwarding of the test data flow 5 may comprise:
- changing, by the second device 6, metadata of individual packets of the incoming test data flow 5, according to block 123a; or
- creating a new data flow with the payload of the incoming test data flow 5, according to block 123b.

According to block 114, the at least one test data flow 5 may be determined based at least in part on one or more of:
- a traffic pattern expected during regular operation of the network 1;
- a topology of the network 1;
- a configuration of the network 1; and
- traffic scheduling of the network 1.

According to block 115, the path through the network 1 from the first device 4 to the second device 6 may be chosen to comprise all network infrastructure devices 2a-2f of the network 1.

FIG. 2 illustrates an exemplary application of the method 100 to a network 1 that comprises six TSN bridges 2a-2f as network infrastructure devices and six end devices 3a-3f attached to the TSN bridges 2a-2f. Also, in this example, a diagnostic entity 7 is attached to TSN bridge 2c.

In the example shown in FIG. 2, the end device 3b is chosen as first device 4, and the end device 3f is chosen as second device 6. A data flow 5' is sent from the diagnostic entity 7 to the first device 4. The first device 4 is instructed by the diagnostic entity 7 to forward the data flow 5' as the test data flow 5 to the second device 6. Likewise, the second device 6 is instructed by the diagnostic entity 7 to forward the test data flow 5 to the diagnostic entity 7. In the example shown in FIG. 2, the first device 4 and the second device 6 request network resources for their respective forwarding tasks from a network management entity 9. That is, the configuration of the TSN bridges 2a-2f changes to accommodate the forwarding of the test data stream 5 from the first device 4 to the second device 6 and on to the diagnostic entity 7. This is not shown in FIG. 2 for clarity.

FIG. 3 illustrates another exemplary application of the method 100 to the same network 1 that is shown in FIG. 2. Compared with FIG. 2, in the example shown in FIG. 3, TSN bridge 2a is chosen as the first device 4, and TSN bridge 2d is chosen as the second device 6. A data flow 5' originating from the diagnostic entity 7 is injected into the network 1. This data flow 5' makes a first U-turn at the first device 4 to proceed onto the second device 6 as test data flow 5. At the second device 6, the test data flow 5 makes another U-turn to proceed on to the diagnostic entity 7. To accommodate the forwarding of the data stream 5 throughout the network 1, the configuration of all TSN bridges 2a-2f is updated by the diagnostic entity 7, optionally with the aid of a helper application installed on each TSN bridge 2a-2f.

At the same time, the method is totally flexible as to how and where the diagnostic entity is integrated into the network. For example, the diagnostic entity may be at least partially implemented on a regular participant of the network, on an additional participant added to the network specifically for the testing.

The test data flow may, for example, be supplied by the diagnostic entity. But the test data flow may also be generated by the first device, depending on the processing capabilities of the first device.

The testing of the network may, for example, be initiated by the diagnostic entity. But this is not required. Rather, the testing may also be initiated by the first device. If the first device initiates the testing and also supplies its own test data flow, the diagnostic entity may be basically reduced to the role of listening to test data flow and diagnostic metrics derived from it, and drawing conclusions as to the proper operation of the network from this information.

In a particularly advantageous embodiment, the diagnostic entity is at least partially implemented as a part of:
- a Centralized User Configuration, CUC,
- a Centralized Network Configuration, CNC, and/or
- an engineering tool of a time-sensitive network, TSN.

In this manner, any changes to the configuration of the network that are needed to convey the test data flow from the first device to the second device, or to convey the test data flow and/or diagnostic metric from the second device to the diagnostic entity, may be directly coordinated by the diagnostic entity. For example, bandwidth and other resources may need to be allocated for transmitting the test data flow.

In one embodiment, the first device and the second device are chosen to be end devices that are sources and/or sinks for traffic in the network. Examples for such end devices include computers, sensors, actuators or controllers in a distributed control system. Such end devices have more computing power and are more capable of processing the test data flow on a more abstract level, i.e. on a higher OSI layer, than pure network infrastructure devices that might do most of their work on OSI layer 2, the data link layer, or on layer 3, the network layer. This higher-level processing comes at the price that it is more prone to unexpected delays. To reduce the effect of such unexpected delays on the measurement of network performance, it may be advantageous to derive, by the second device, at least one diagnostic metric from the received test data flow. This diagnostic metric is not changed if it is conveyed to the diagnostic entity and experiences further delays in transit.

Due to their larger processing resources, end devices as first and second devices are also able to a larger extent to participate in publish-subscribe systems that are in use in the network, such as the PubSub feature in the Open Platform Communications Unified Architecture, OPC UA. In a publish-subscribe system, entities may publish messages in one or more channels or topics. Entities may subscribe to channels or topics and then receive any messages subsequently published in these channels or topics.

Therefore, in a further advantageous embodiment, the method further comprises:
  publishing, by the diagnostic entity, to a topic and/or channel to which the first device is subscribed, an instruction to send the test data flow to the second device; and
  publishing, by the diagnostic entity, to a topic and/or channel to which the second device is subscribed, an instruction to send the received test data flow, and/or the diagnostic metric, to the diagnostic entity.

In particular, if the end devices are field devices or controllers for use in a distributed control system, DCS, of an industrial plant, and these devices are already aware of OPC, then they will have OPC UA PubSub already built in. In this case, it is particularly easy to deploy the software that will enable the end devices to act as first and second devices for diagnosing the network. This software may call on the PubSub functionality that is already present, tried and tested. There is a lesser possibility for error and a smaller footprint of the additional software. Likewise, in other use cases where other publish-subscribe mechanisms than OPC UA PubSub are already used for the normal operation of end devices, this publish-subscribe mechanism may be re-used to convey instructions from the diagnostic entity to the first and second devices.

The test data flow may in principle be generated by the first device itself. But the test data flow may also be supplied by the diagnostic entity who might be better aware of which particular data flows might be appropriate to perform a "stress test" on the network. That is, the first device will receive the test data flow from the diagnostic entity and then pass it on to the second device. In order to reduce additional delays by this process, the instruction to send the test data flow to the second device may comprise an instruction to convert a data flow received from the diagnostic entity into the test data flow by changing metadata of this data flow. In particular, such metadata may comprise a stream identifier and/or scheduling information related to the data flow. By amending the metadata without actually touching the payload, the test data flow may be obtained with a minimum amount of effort on the side of the first device. The data flow merely makes a "U-turn" at the first device.

Likewise, the test data flow may make a similar "U-turn" at the second device to be passed on to the diagnostic entity. Thus, the instruction to send the received test data flow to the diagnostic entity may comprise an instruction to change metadata of this received test data flow.

As mentioned above, in a network where bandwidth and other resources are scheduled or otherwise allocated, such resources may need to be procured for the additional traffic that is generated in the course of the method. Therefore, in a further advantageous embodiment, the first device requests, from a network management entity, configuration of network infrastructure devices so as to provide a path from the first device to the second device. Alternatively or in combination to this, the second device requests, from a network management entity, configuration of network infrastructure devices so as to provide a path from the second device to the diagnostic entity. These requests may, for example, be conveyed by a publish-subscribe (PubSub) brokering mechanism. For example, if the request cannot be granted immediately due to resource shortages, the first device and the second device may decide which other traffic may be temporarily sacrificed in order to free up resources for the testing.

In another embodiment, the first device and the second device are chosen to be network infrastructure devices that forward data flows between end devices as sources and sinks. Examples for such network infrastructure devices include switches, routers, bridges and wireless access points. As discussed before, these network infrastructure devices usually have more limited processing capabilities for data flows than end devices, and handle them on lower OSI layers (usually layer 2 or layer 3 at most). On the other hand, this processing happens very fast with only little additional delay, if any. That is, a data flow originating from the diagnostic entity may be sent on one or more "U-turns" through the network and back to the diagnostic entity very efficiently by network infrastructure devices.

A large part of the network infrastructure may therefore be tested by injecting only one test data flow. The only part of the network that cannot be covered by this test are the connections between network infrastructure devices and end devices. To detect any problems on these connections, such as loose connections or faulty transceivers, end devices need to be used as first and second devices as described above. But in most applications, the more important test is the test of the network infrastructure that may be performed by passing the test data flow among network infrastructure devices. In a switched network, a problem on a connection to an end station will only affect this one end station. But a problem in the network infrastructure may affect many end devices and is more likely to impair the functioning of the industrial plant where the network is being used.

In particular, because the test data flow may be sent on even multiple "U-turns" through the network without undue delay, it may be fed back to the same diagnostic entity from which it originated. This means that this one diagnostic entity may directly evaluate the finally received test data flow with respect to, e.g. completeness and latency. Previously, in many testing situations, "two-point testing" was used. I.e., the test data flow was sent from a first diagnostic entity via the network to a second diagnostic entity that then performed the evaluation. Having only one diagnostic entity in a "one-point testing" setting is only a minimal addition to the network for the purpose of testing. Apart from saving the cost for a second diagnostic entity, this serves to more accurately measure the performance of the network in the actual state in which it will be used for its intended purpose. Moreover, it becomes easier to move this one single diagnostic entity to different points in the network, so as to probe it from different perspective and possibly catch problems that are visible only from a certain perspective.

To send a data flow onto U-turns, in a particularly advantageous embodiment, the diagnostic entity changes a forwarding configuration of the first device to forward a data flow received from the diagnostic entity to the second device as the test data flow. Likewise, the diagnostic entity changes a forwarding configuration of the second device to forward a test data flow received from the first device to the diagnostic entity. If sufficient computing power is available on the respective device, the changing of the forwarding configuration may be triggered via a publish-subscribe system used in the network, such as OPC UA PubSub.

There are two main ways for the first device and the second device to forward the test data flow. The first way is to change, by the first device or by the second device, metadata of individual packets of the incoming test data flow. This is a particularly fast way to re-route the test data flow by means of OSI layer 2 processing. The second way is to create a new data flow with the payload of the incoming test data flow in a "pick up—change—forward" manner. In this manner, the device may collect more detailed diagnostic metrics (such as timing information), at the price that the required processing is more complex and requires more computing power on the side of the first or second device.

In general, in a method according to the disclosure, the at least one test data flow is determined based at least in part on one or more of:
 a traffic pattern expected during regular operation of the network;
 a topology of the network;
 a configuration of the network; and
 traffic scheduling of the network.

In this manner, depending on the goal to be achieved with the testing, the test data flow may be tailored to be similar to traffic that is to be expected during regular operation of the network. But the test data flow may also be specifically crafted to "stress-test" particular aspects of the network. For example, if a certain network resource is known to be scarce, the test data flow may be crafted to test whether this resource may be driven into exhaustion.

Not all functionality of the method needs to be concentrated in one single diagnostic entity. In particular, if the diagnostic entity instructs end devices or network infrastructure devices to perform certain actions (such as forwarding a test data flow), then these actions may be implemented by means of a helper software application that runs in the respective device. This helper application may extend the functionality of the normal software and/or firmware running on the respective device. For example, an end device that is normally used to acquire measurement values and send them to a controller via the network might lack the functionality for sending an incoming data flow onto a "U-turn". The software of a network infrastructure device might already have the "U-turn" functionality, but might lack a "pick up—change—forward" functionality that allows to derive advanced diagnostic metrics from the test data flow.

The method may be wholly or partially computer-implemented. The invention therefore also relates to one or more computer programs with machine-readable instructions that, when executed on one or more computers and/or compute instances, cause the one or more computers to perform the method. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well. In particular, a network may be embodied as a software-defined network running on universal hardware.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 network
2a-2f network infrastructure devices in network 1
3a-3f end devices in network 1
4 first device for testing
5, 5' test data flow
5a diagnostic metric derived from test data flow 5
6 second device for testing
7 diagnostic entity
8 predetermined criterion for proper working of network 1
9 network management entity
determination regarding proper working of network 1
100 method for testing network 1
105 choosing end devices 3a-3f as first device 4 and second device 6
106 choosing network devices 2a-2f as first device 4 and second device 6
110 sending test data flow 5 to second device 6
111 publishing instruction to send test data flow 5 to second device 6
111a converting data flow 5' by changing metadata
112 requesting path to second device 6 from network management entity 9
113 changing forwarding configuration of first device 4
113a changing metadata of individual packets of data flow 5'
113b creating new data flow with payload of incoming data flow 5'
114 determining test data 5 based on specific information
115 choosing path through network 1 to cover all network devices 2a-2f
120 sending test data flow 5, diagnostic metric 5a to diagnostic entity 7
121 publishing instruction to send data flow 5, metric 5a to diagnostic entity 7
121a changing metadata of received test data flow 5
122 requesting path to diagnostic entity 7 from network management entity 9
123 changing forwarding configuration of second device 6
123a changing metadata of individual packets of data flow 5
123b creating new data flow with payload of incoming data flow 5
130 obtaining determination 10 regarding proper working of network 1

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one"followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for testing a network that comprises multiple devices, the method comprising:
    sending, by a first device that is a regular participant of the network, on a path through the network, a test data flow to a second device that is another regular participant of the network;
    sending, by the second device, the test data flow to a diagnostic entity; and
    determining, by the diagnostic entity, based at least in part on the test data flow received from the second device, whether a path through the network is performing according to at least one predetermined criterion;
    publishing, by the diagnostic entity, to a topic and/or channel to which the first device is subscribed, an instruction to send the test data flow to the second device; and
    publishing, by the diagnostic entity, to a topic and/or channel to which the second device is subscribed, an instruction to send the test data flow received from the first device to the diagnostic entity,
    wherein the first device and the second device are chosen to be end devices that are sources and/or sinks for traffic in the network during the intended regular operation of the network.

2. The method of claim 1, wherein the second device adds at least one diagnostic metric derived from the test data flow, to the test data flow.

3. The method of claim 1 wherein the instruction to send the test data flow to the second device further comprises an instruction to convert a data flow received from the diagnostic entity into the test data flow by changing metadata of the data flow.

4. The method of claim 1 wherein the instruction to send the received test data flow to the diagnostic entity further comprises an instruction to change metadata of the test data flow received at the second device.

5. The method of claim 1, further comprising requesting, by the first device, from a network management entity, configuration of network infrastructure devices for providing a path from the first device to the second device.

6. The method of claim 1, further comprising requesting, by the second device, from a network management entity, configuration of network infrastructure devices for providing a path from the second device to the diagnostic entity.

7. The method of claim 1, wherein the first device and the second device are chosen to be network infrastructure devices that forward data flows between end devices as sources and sinks.

8. The method of claim 7, further comprising changing, by the diagnostic entity, a forwarding configuration of the first device to forward a data flow received from the diagnostic entity to the second device as the test data flow.

9. The method of claim 8, further comprising changing, by the diagnostic entity, a forwarding configuration of the second device to forward the test data flow received from the first device to the diagnostic entity.

10. The method of claim 9, wherein the forwarding of the test data flow comprises changing, by the first device or by the second device, metadata of individual packets of the incoming test data flow.

11. The method of claim 9, further comprising creating a new data flow based on a payload of the incoming test data flow.

12. The method of claim 1, wherein the test data flow is determined based at least in part on one or more of:
    a traffic pattern expected during regular operation of the network;
    a topology of the network;
    a configuration of the network; and
    traffic scheduling of the network.

13. The method of claim 1, wherein the network is chosen to be a network that is configured to carry network traffic of a distributed control system, DCS, in an industrial plant.

14. The method of claim 1, wherein the diagnostic entity is at least partially implemented as a part of:
    a Centralized User Configuration, CUC,
    a Centralized Network Configuration, CNC, and/or
    an engineering tool of a time-sensitive network, TSN.

15. The method of claim 1, wherein the path through the network from the first device to the second device is chosen to comprise all network infrastructure devices of the network.

* * * * *